I. A. WEAVER.
TIRE CHANGER.
APPLICATION FILED OCT. 17, 1917.
1,341,727.
Patented June 1, 1920.
4 SHEETS—SHEET 3.
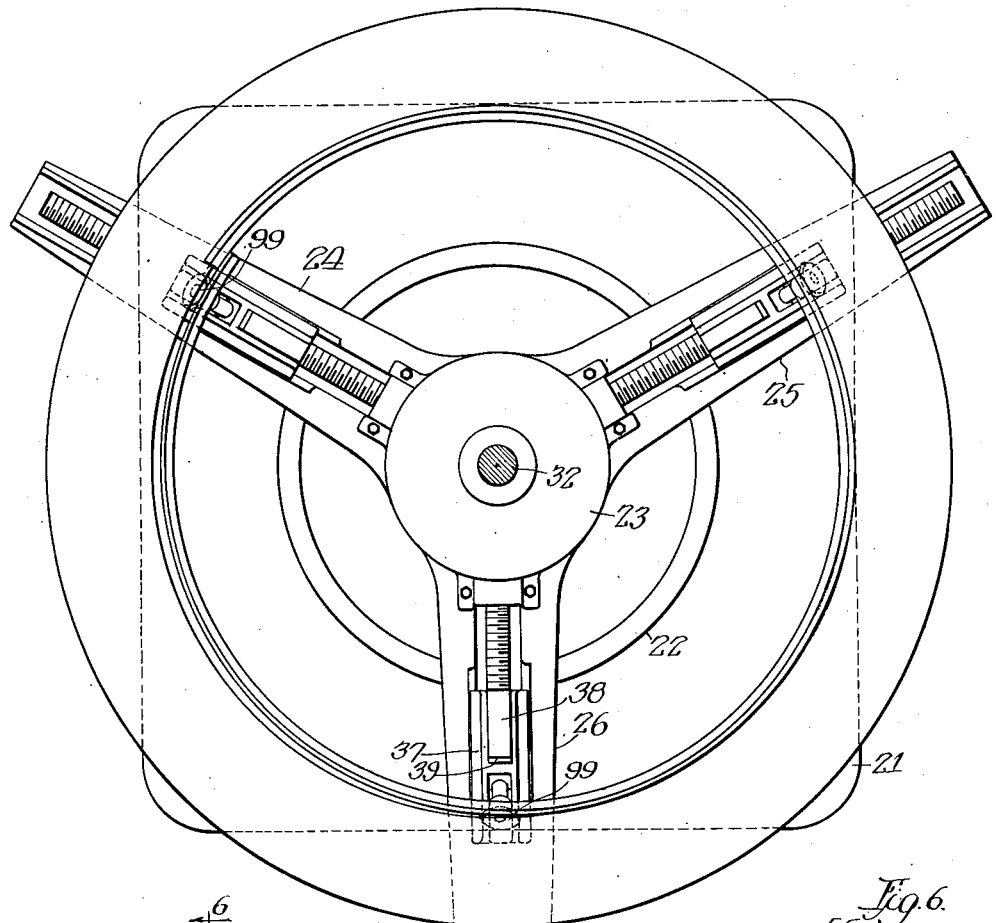
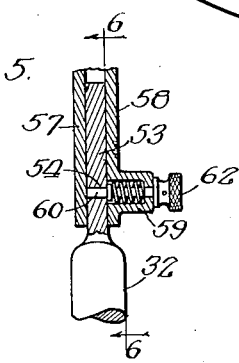

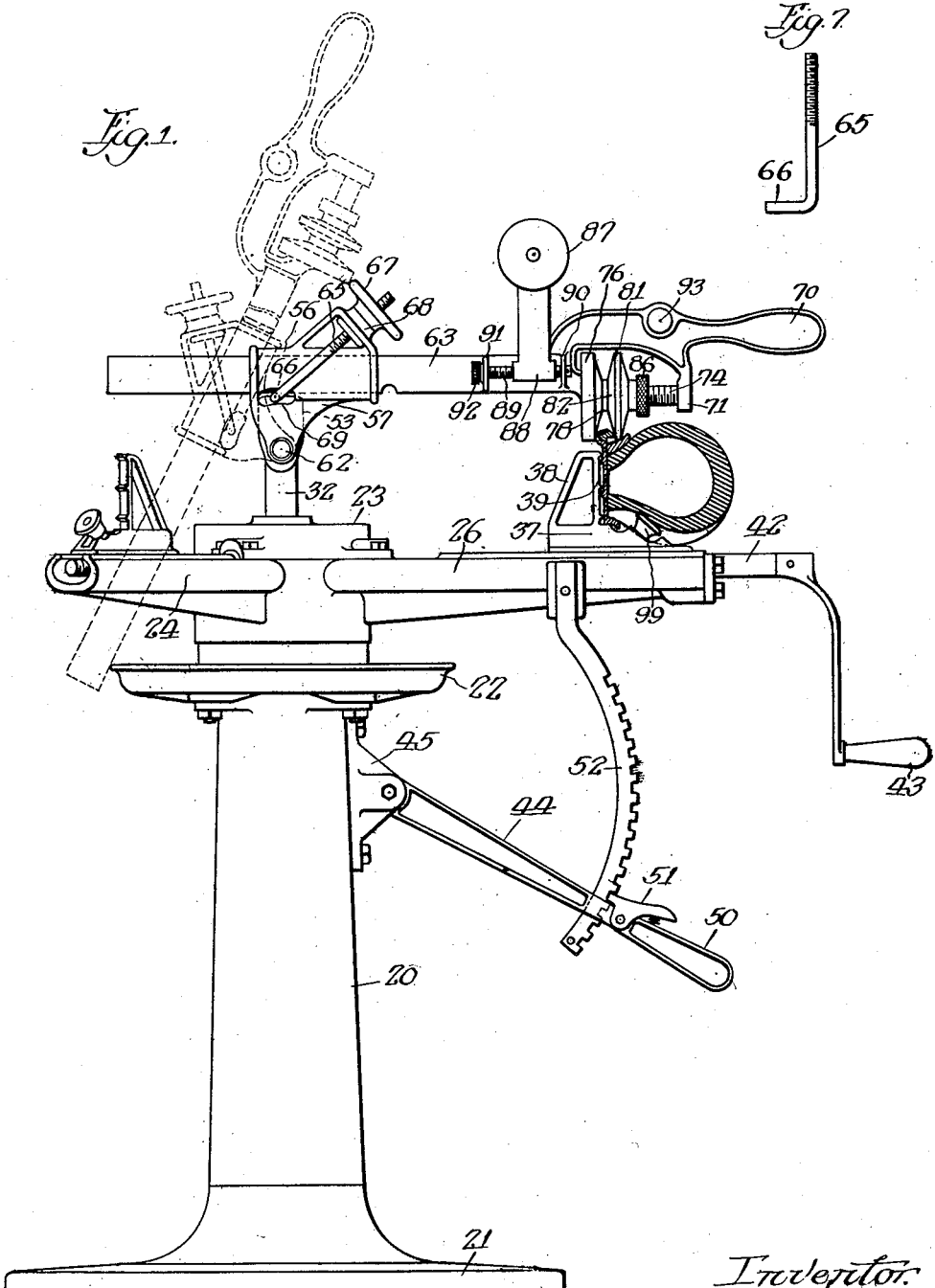

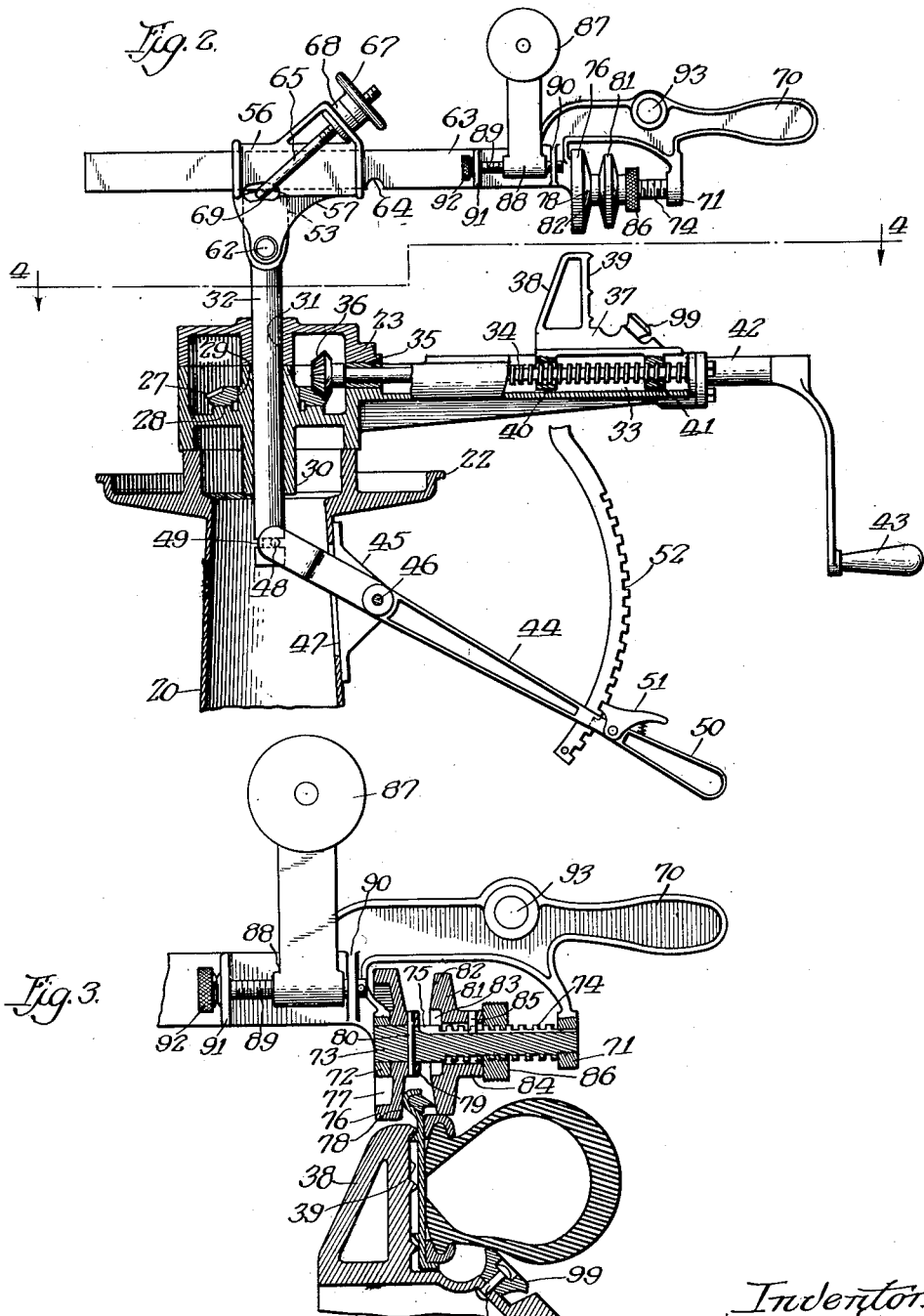

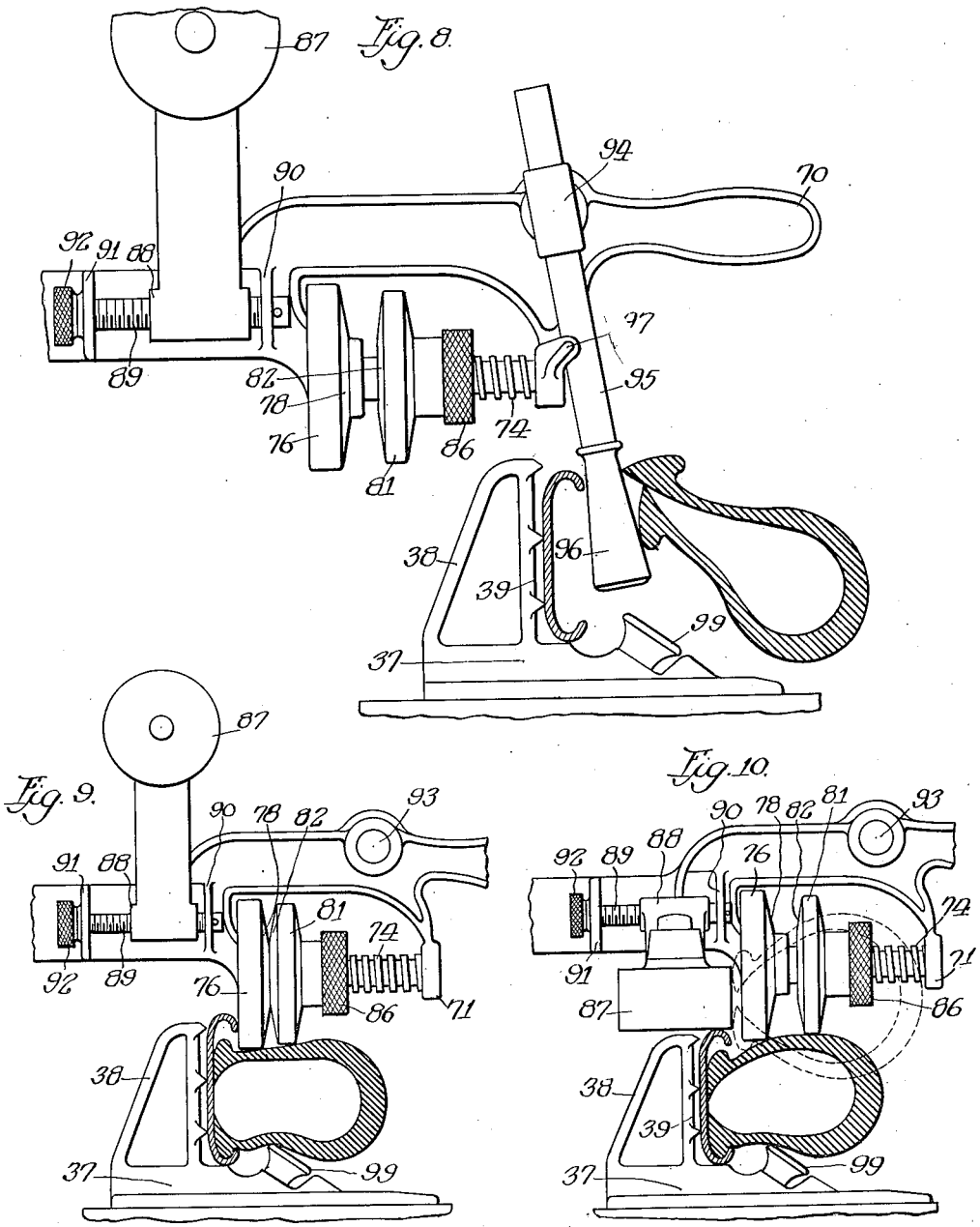

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

TIRE-CHANGER.

1,341,727.     Specification of Letters Patent.     Patented June 1, 1920.

Application filed October 17, 1917. Serial No. 197,010.

*To all whom it may concern:*

Be it known that I, IRA A. WEAVER, a citizen of the United States, residing at Springfield, in the county of Sangamon and State of Illinois, have invented certain new and useful Improvements in Tire-Changers, of which the following is a specification.

The provision of a simple, efficient appliance to facilitate the changing of tires of various types on rims and wheels of different sizes and structural characteristics constitutes the subject-matter of the present invention. One object of the invention is the production of an apparatus of this general character in which the main operative arm carrying the tool or tools for co-action with the rim and tire casing is adjustable or removable, whereby to permit an easy and quick application of a rim or wire or other wheel to the appliance ready for the removal or application of its tire. A further feature of the invention is a minimum of operations of the appliance required in the manipulation of various styles of rims. And an additional salient feature is the production of a construction which acts efficiently on rims of the quick detachable demountable type even though they are out of true or bent out of round.

Various other features of novelty and advantage in an appliance embodying this invention will be appreciated by those skilled in the art from an understanding of a preferred embodiment of the invention such as is illustrated in the accompanying drawings forming a part of this specification and throughout the various views of which like reference characters refer to the same parts and also from the following detailed description of the same.

In these drawings:

Figure 1 is an elevation of the improved appliance;

Fig. 2 is a fragmentary central vertical section;

Fig. 3 is a detail section illustrating the operation of the companion rollers co-acting with a rim of the quick-detachable demountable type;

Fig. 4 is a horizontal section on line 4—4 of Fig. 2 showing the manner of contracting a split rim;

Fig. 5 is a vertical section showing the pivotal mounting of the socket for the horizontal tool-carrying arm on the vertically-adjustable upright shaft;

Fig. 6 is a section on line 6—6 of Fig. 5;

Fig. 7 is a face view of the locking member for the horizontal arm and its associated socket fulcrumed on the vertical shaft;

Fig. 8 illustrates the manner of removing a clencher tire from an unsplit rim;

Fig. 9 indicates the mode of freeing the bead portion of such a tire from its rim, and Fig. 10 shows the way of applying such a tire to its rim.

Referring to the drawings, it will be observed that the appliance comprises a hollow standard 20 having an extended base 21 adapted to rest on the floor and having near its top end an annular tool-holding shelf or ledge 22. Above this is located a stationary spider comprising a central hub-portion 23 mounted on the standard and three radiating arms 24, 25, and 26 adapted to support the rim or wheel and tire to be acted upon. Hub 23 is hollow, as shown in Fig. 2, and accommodates within it a horizontal bevel-gear 27 revoluble on bearings 28 and 29, the former being flat and the latter cylindrical, on the exterior of a central bearing portion 30 which has an upright, internal, central bearing 31 accommodating a vertical shaft 32 adapted both to rotate and be vertically adjustable therein.

Each of the radial arms 24, 25, and 26 has a longitudinal undercut depression or groove 33 in its top surface accommodating a screw-threaded shaft 34, a cylindrical inner end portion of which is received in a bearing 35 in the hub 23. The end of such shaft protruding into the interior of the hub has a bevel-pinion 36, the teeth of all three of which are in mesh with those of their common gear 27. Each arm and its groove is provided with a rim-supporting member 37 bearing and slidable longitudinally on its corresponding spider arm and having an upward extension or rim holding jaw 38 with a ribbed outer surface 39 adapted to co-act with the inner surface of a separate rim or a rim permanently secured to its wheel. Each of these members has a pair of depending lugs 40 and 41 accommodated in the corresponding channel 33 of the arm, the inner lug 40 having a cylindrical aperture for the reception of the threaded shaft 34, the outer lug or ear 31 having a threaded bearing for the screw-threaded part of the shaft. It will be clear, therefore, that the three supports or jaws may be simultaneously expanded or contracted by reason of their pinion connections with the common bevel-gear 27. The shaft 34 of the arm 26 is somewhat longer than the others, its outer end being revolubly accommodated in a bearing 42, (Figs. 2 and 4), the extreme end of the shaft being fitted with a turning handle 43. By manipulation of this handle all of the three jaws 37 may be made to travel simultaneously outwardly or inwardly as occasion requires, such members desirably having sliding bearings on the tops of the three arms.

A lever 44 is fulcrumed at 46 on a bracket 45 mounted on the side of the standard 20 and extends into the interior of the part 20 through a slot 47 and its inner bifurcated end straddles the lower portion of the vertical shaft 32 and has pins 48 located in a groove 49 of the shaft, thus permitting rotation of the shaft and elevation and depression thereof through manipulation of the lever. This lever 44 at its outer end is equipped with a handle 50 and a spring-actuated thumb-controlled catch or dog 51 adapted to coöperate or enter any of the notches of a curved, notched bar 52 secured to and depending from the arm 26.

The top end of shaft 32 is flattened at 53, which portion is provided with a hole 54 extended therethrough, the extreme flattened end of the shaft having a notch 55. A socket-member 56 has two spaced legs 57 and 58 receiving between them the portion 53 of the shaft, the leg 58 having, as is shown in Fig. 5, a hollow boss 59 containing a spring-pressed pivot or fulcrum pin 60 adapted to enter the hole 54 and capable of withdrawal therefrom by reason of a knob or handle 62, thus permitting such socket member to be entirely removed or demounted from the shaft.

Member 56 slidingly accommodates a radial arm or bar 63 provided in its lower edge with a notch or recess 64, the socket-member having an L-shaped lock 65 with a bent end 66, the rod 65 being screw-threaded and equipped with a knurled nut 67 adapted to bear on an inclined portion 68 of the member, the lock as a whole having an inclination as shown in Fig. 2, its end 66 normally extending through an aperture 69 in one wall of the member and into the notch 55, thus locking the parts 32 and 56 rigidly together, preventing rocking of the latter on its fulcrum 60.

If, however, the bar 63 is slid inwardly through the member 56 sufficiently to bring its notch 64 into register with the catch 66, and if the nut 67 is turned so as to raise the part 66 out of the notch 55 and into the recess 64, then the bar 63 is locked to the socket-member and both are free to turn or rock on the shaft 32 on the fulcrum pin 60 into the dotted line position shown in Fig. 1. Of course, shifting of the elements and manipulation of the nut and the bar may restore the parts to the locked relation shown in full lines in Figs. 1 and 2, under which condition the bar 63 is easily slidable in its socket.

The outer end of arm 63 is received in and is fastened to a manipulating or operating handle 70 and the handle portion also has two depending bearings 71 and 72 for the end portions of a shaft 73 revoluble therein, a part 74 of the shaft being screw-threaded as illustrated in Fig. 3, the shaft also having a longitudinal groove or keyway 75. Mounted on this shaft is a roller 76 recessed on one face at 77 for the accommodation of the overhanging bearing 72, the opposite face of the roller being slightly beveled or of conical shape as indicated. Extended outwardly from such face of the roller, there is a hub 79 fixed to the shaft by a transverse pin 80. Another roller 81 of somewhat smaller diameter is also mounted on the shaft and this also has a beveled or conical surface 82 of an inclination the opposite of that of the companion roller 76 and such beveled face of the roller is recessed at 83 for the reception of the hub 79 of the companion roller when it is desired to bring the two rollers into close relation, as shown for example in Fig. 9. This roller 81 has a hub 84 equipped with a pin 85 projecting into the groove or keyway 75 so that this roller, as well as the other, rotates with the shaft. In order to effect the adjustment of these rollers toward and from one another, the screw-threaded shaft is provided with a knurled nut 86 adapted to bear against the end of hub 84 to maintain the roller 81 in adjusted position. Inasmuch as all of these three parts 76, 81, and 86 rotate with the shaft, there is no tendency for the elements to get out of adjustment.

This rotatable arm 63 is additionally provided with a horizontal roller 87 the threaded mounting 88 of which is carried on a threaded shaft 89 revoluble in two bearings 90 and 91 and capable of manipulation by a knurled handle 92. By these means the position of the roller may be readily adjusted as may be required for rims and tires of different diameters. As this roller is not in register with the axis of its companion roller 76 but is on a forwardly extended arm it is clear that its position would not be correct for all sizes of rims and hence this adjustment is provided. When such roller is to be used it is swung down to its lower position shown in Fig. 10, and when not to be used it is swung up into inoperative position.

Handle 70 has a transverse hole 93 adapted under certain circumstances to receive the lateral stem of a socket 94, (Fig. 8), designed to receive a rod 95 carrying at its lower end an elongated tapered roller 96 employed in the removal of clencher tires from unsplit rims. In order to hold this tool properly in position the bearing member 71 is provided with a fork 97 in which the tool rests and which prevents the turning of the socket-member 94 relatively to the handle.

The operation of this apparatus is practically as follows:

Assuming that it is desired to place a rim and its tire on the device the adjusting nut 67 is manipulated, after the bar 63 has been pushed inwardly, so as to draw up the locking end 66 of the catch 65 into the notch 64, thus locking the bar 63 to the socket-member 56; but permitting the two to swing as a unit about the pivot 60 into the dotted position of Fig. 1, whereupon the rim may be readily placed over the three members 37, which, of course, have been previously sufficiently contracted by turning the handle 43 to receive the rim.

In case a wire or other wheel is to be placed upon the appliance, the operator pulls on the head 62 of the fulcrum pin 60 and retracts the latter from the hole in the flat end of shaft 32, thus permitting the complete demounting of the bar 63 and its attached socket-member 56. After placing the wheel in position, these parts are, of course, put back in place.

Let us assume first that it is desired to apply a tire to a rim of the quick-detachable demountable type employing a locking ring accommodated in a groove of the rim. The tire and its one or more retaining flange rings are placed on the rim in the usual way. In the hand mounting of such a tire on its rim, difficulty is encountered in pressing one of such flanges inwardly to permit the entrance of the locking ring into its grooves, and in keeping such locking ring fully in its groove to permit the adjacent flange ring to overlap it, but in this appliance these troubles are entirely and easily overcome. The two rollers 76 and 81, (Fig. 3), are adjusted relatively to one another by the nut 86 so that the inclined surface 78 of the one will be adapted to ride on the inner face of the rim while the outer curved periphery of the other will be adapted to press inwardly the flange ring coöperating with the bead of the casing and the conical face of the roller at the same time will engage the locking ring forcing it fully home into its groove. The vertical position of the arm 63 as will be readily understood, may be easily adjusted by manipulation of the lever 44, so that a proper and desirable pressure will be brought to bear on the various parts. By grasping the handle 70 and swinging the arm 63 around, the supporting shaft 32 turning in its bearing, the rollers 76 and 81 can accommodate themselves without difficulty to irregularities in the shape of the rim, as, for instance, the latter may be somewhat out of round. This capability of action on the part of the rollers is inherent in the sliding capacity of the arm 63 in the socket 56. As the arm 63 is thus swung around, the succeeding portions of the locking ring are progressively brought under the influence of the roller 81, which forces the ring into its groove and at the same time presses the flange ring downwardly out of the way. As soon as the roller passes along, however, the latter springs up into place, overlapping the locking ring and holding it properly seated in its groove, and such locking ring, in turn of course, maintains the flange ring in position and prevents its being removed from the rim.

To remove the tire from such a rim, practically the reverse of the above-stated operation is carried out. That is to say, the roller 81 presses down the flange ring and the locking ring being thus freed is progressively removed from its groove, the initial delivery of its end being effected, of course, by hand, and when it is thus led out, the turning of the arm 63 facilitates the removal of the remainder, all as will be readily appreciated.

With straight side tires on quick detachable rims with locking-rings, practically the same operation is followed, but, of course, the flange ring is of somewhat different shape and the locking-ring may also be of different form or cross-section. The method of manipulation of the device, however, remains substantially the same.

In case it is desired to remove a clencher casing from an unsplit rim the two rollers 76 and 81 are brought close together as shown in Fig. 9, and the arm 63 is so positioned as to bring the roller 76 outside of the rim. By adjusting the height of the arm correctly, these combined rollers, by pressing downwardly on the casing adjacent to the bead, easily free the latter from the rim even though the casing may have become so-called frozen to the rim. Then the tool 95 is inserted between the rim and both bead portions and applied to the handle portion 70 of the arm 63 and its roller end 96, as shown in Fig. 8, whereupon, by swinging the arm 63 around, the entire casing is lifted free from the rim, in other words, it is quickly and easily removed.

In order to apply a clencher casing to an unsplit clencher rim, the two rollers 76 and 81, as well as the roller 87, are employed. This latter roller is swung down into the position shown in Fig. 10 so as to progressively stretch both bead portions of the casing, as shown in dotted lines in Fig. 10, over the clencher portion of the rim and adjacent to this roller 87 are the rollers 76 and 81, somewhat spaced apart as shown in Fig. 10, which force these bead portions of the casing downwardly into the rim, as shown in full lines. That is to say the roller 87 expands or stretches the casing radially and the rollers 76 and 81 press it downwardly and cause it to be forced over and become caught under the upper clencher part of the rim.

To those skilled in this art many minor mechanical changes in the appliance will suggest themselves and these may be adopted without departing from the essence of the invention and without sacrificing any of its substantial benefits and advantages. The device herein set forth is also capable of other uses which will readily occur to those acquainted with the problems of applying and removing casings from rims.

I claim:

1. In an appliance of the character described, the combination of a support, means to fixedly clamp a vehicle-wheel rim or wheel on said support, a revoluble upright shaft coaxial with the rim or wheel, a radial arm mounted on said shaft and adapted to carry one or more tools, and means affording a sliding connection between said arm and shaft, substantially as described.

2. In an appliance of the character described, the combination of a support for a vehicle wheel rim, a revoluble upright shaft, and a radial arm having a rocking connection on said shaft and adapted to carry one or more tools, whereby said arm may be rocked on said shaft out of the way to facilitate the placing or removal of the rim, substantially as described.

3. In an appliance of the character described, the combination of a support, means to fixedly clamp a vehicle-wheel rim on said support, a revoluble upright shaft in said support, a radial arm mounted on said shaft and adapted to carry one or more tools, and means affording a rocking and sliding connection between said arm and shaft, the arm being adapted to be rocked on the shaft out of the way to facilitate the placing or removal of the rim, substantially as described.

4. In an appliance of the character described, the combination of a support for a vehicle wheel rim or wheel, a revoluble upright shaft, a radial arm mounted on said shaft and adapted to carry one or more tools, and a detachable connection between said arm and shaft whereby the former may be removed to facilitate the placing or removal of the rim or wheel, substantially as described.

5. In an appliance of the character described, the combination of a support for a vehicle wheel rim or wheel, a revoluble upright shaft, a socket rockingly mounted on said shaft, means to lock said socket against rocking on said shaft, and a radial arm slidable in said socket and adapted to carry one or more tools, substantially as described.

6. In an appliance of the character described, the combination of a support for a vehicle wheel rim or wheel, a revoluble upright shaft, a socket pivoted on said shaft, a radial arm slidable in said socket and adapted to carry one or more tools, and means to lock said socket against turning on said shaft and to lock said arm against sliding in said socket, substantially as described.

7. In an appliance of the character described, the combination of a support for a vehicle wheel rim or wheel, a notched revoluble upright shaft, a socket pivoted on said shaft, a notched radial arm slidable in said socket and adapted to carry one or more tools, and a locking member on said socket adapted to engage the notch in the shaft and hold the socket against turning on its pivot, or to be retracted from the shaft notch and enter the notch in the arm to lock the latter against sliding in the socket, substantially as described.

8. In an appliance of the character described, the combination of a support, means to fixedly clamp a vehicle-wheel rim or wheel on said support, a radial arm revoluble about the axis of the wheel or rim, a pair of coaxial rollers on said arm adapted to facilitate the tire-changing operation, means to adjust said rollers axially relatively to one another, and means to adjust said arm toward and from the plane of the rim or wheel, substantially as described.

9. In an appliance of the character described, the combination of a support, means to fixedly clamp a vehicle-wheel rim on said support, a radial arm revoluble about the axis of the wheel or rim, and a pair of coaxial rollers on said arm, one of said rollers being of greater diameter than the other, substantially as described.

10. In an appliance of the character described, the combination of a support, means to fixedly clamp a vehicle-wheel rim or wheel on said support, a radial arm revoluble about the axis of the wheel or rim, means to adjust said arm toward and from the plane of the wheel or rim, a pair of coaxial rollers of different diameters on said arm, and means to adjust said rollers axially relatively to one another, substantially as described.

11. In an appliance of the character described, the combination of a support, means to fixedly clamp a vehicle-wheel rim or wheel on said support, a radial arm revoluble about the axis of the wheel or rim, means to adjust said radial arm toward and from the plane of the rim or wheel, an arm hinged on and extended laterally from said radial arm, a roller on said second arm, and means to adjust said roller arm lengthwise said radial arm, substantially as described.

12. In an appliance of the character described, the combination of a support for a vehicle wheel rim or wheel, a radial arm, said support and arm being relatively revoluble, a screw-threaded shaft disposed lengthwise on said radial arm, a roller arm having a rocking engagement with and adjustable on the radial arm by said screw-threaded shaft, and a roller on said roller arm, substantially as described.

13. In an appliance of the character described, the combination of a support, means to fixedly clamp a vehicle-wheel rim or wheel on said support, a radial arm on said support revoluble about the axis of the rim or wheel, a pair of coaxial rollers on said arm, and another roller on said arm having an operative plane at substantially right-angles to the planes of said pair of rollers, substantially as described.

14. In an appliance of the character described, the combination of a support, means to fixedly clamp a vehicle-wheel rim or wheel to said support, a radial arm revoluble about the axis of said rim or wheel, a pair of coaxial rollers of different diameters on said arm, and another roller on said arm having an operative plane at substantially right-angles to the planes of said pair of rollers, substantially as described.

15. In an appliance of the character described, the combination of a support, means to fixedly clamp to said support a vehicle-wheel rim or wheel, a radial arm revoluble about the axis of said rim or wheel, a pair of coaxial rollers on said arm, another roller on said arm having an operative plane at substantially right-angles to the planes of said pair of rollers, and means to adjust said roller toward and from said pair of rollers, substantially as described.

16. In an appliance of the character described, the combination of a support, means to fixedly clamp a vehicle-wheel rim or wheel to said support, a radial arm revoluble about the axis of said rim or wheel, a pair of coaxial rollers on said arm, means to adjust said rollers relatively to one another lengthwise said arm, another roller on said radial arm having an operative plane at substantially right-angles to the planes of said pair of rollers, and means to adjust said latter roller toward and from said pair of rollers, substantially as described.

17. In an appliance of the character described, the combination of a support, means to fixedly clamp a vehicle-wheel rim or wheel to said support, a radial arm revoluble about the axis of said rim or wheel, means to adjust said arm toward and from the plane of the rim or wheel, a pair of coaxial rollers of different diameters on said arm, means to adjust said rollers axially toward and from one another, a screw-threaded shaft disposed lengthwise on said radial arm, a roller arm having a rocking engagement with and adjustable on the radial arm by said screw-threaded shaft, and a roller on said roller arm, substantially as described.

IRA A. WEAVER.

Witnesses:
La Rue Black,
Estelle Davis.